(12) United States Patent
Harris et al.

(10) Patent No.: US 11,714,748 B1
(45) Date of Patent: Aug. 1, 2023

(54) MANAGING POWER LOSS RECOVERY USING AN OLDEST SECTION WRITE POLICY FOR AN ADDRESS MAPPING TABLE IN A MEMORY SUB-SYSTEM

(71) Applicant: Micron Technology, Inc., Boise, ID (US)

(72) Inventors: Byron Harris, Mead, CO (US); Daniel Boals, Broomfield, CO (US); Abedon Madril, Frederick, CO (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/683,989

(22) Filed: Mar. 1, 2022

(51) Int. Cl.
*G06F 12/02* (2006.01)
*G06F 1/30* (2006.01)
*G06F 12/0804* (2016.01)
*G06F 12/0891* (2016.01)

(52) U.S. Cl.
CPC .......... *G06F 12/0246* (2013.01); *G06F 1/30* (2013.01); *G06F 12/0292* (2013.01); *G06F 12/0804* (2013.01); *G06F 12/0891* (2013.01); *G06F 2212/7201* (2013.01)

(58) Field of Classification Search
CPC ............ G06F 12/0246; G06F 12/0292; G06F 12/0804; G06F 12/0891; G06F 1/30; G06F 2212/7201
See application file for complete search history.

(56) References Cited

U.S. PATENT DOCUMENTS

2013/0080732 A1\* 3/2013 Nellans ............... G06F 12/0246
711/206
2016/0342509 A1\* 11/2016 Kotte .................. G06F 12/0246
2020/0409856 A1\* 12/2020 Navon .................. G06F 12/123

\* cited by examiner

*Primary Examiner* — Prasith Thammavong
(74) *Attorney, Agent, or Firm* — Lowenstein Sandler LLP

(57) ABSTRACT

A logical-to-physical (L2P) address mapping table is maintained, wherein a plurality of sections of the L2P address mapping table is cached in a volatile memory device. A journal entry count is maintained reflecting a number of L2P journal entries associated with an L2P journal. It is determined that the journal entry count satisfies a first threshold criterion. In response to determining that the journal entry count satisfies the first threshold criterion, a writing of the L2P journal to a non-volatile memory device is triggered. A written journal count reflecting a number of L2P journals written to the non-volatile memory device is maintained. In response to determining that the written journal count satisfies a second threshold criterion, a first section of the plurality of sections of the L2P address mapping table is identified. The first section of the L2P address mapping table is written to the non-volatile memory device.

20 Claims, 6 Drawing Sheets

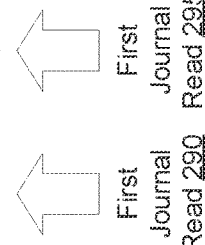

Journal 260

| | | |
|---|---|---|
| Physical Address 261a | Logical Address 261b | Timestamp 261c |
| Physical Address 262a | Logical Address 262b | Timestamp 262c |
| Physical Address 263a | Logical Address 263b | Timestamp 263c |
| Physical Address 264a | Logical Address 264b | Timestamp 264c |

Journal Entry 261
Journal Entry 262
Journal Entry 263
Journal Entry 264

MANAGING POWER LOSS RECOVERY USING AN OLDEST SECTION WRITE POLICY FOR AN ADDRESS MAPPING TABLE IN A MEMORY SUB-SYSTEM

TECHNICAL FIELD

Embodiments of the disclosure relate generally to memory sub-systems, and more specifically, relate to managing power loss recovery using an oldest section write policy for an address mapping table in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 2A is a block diagram illustrating sections of a logical-to-physical (L2P) address mapping table in accordance with some embodiments of the present disclosure.

FIG. 2B is a block diagram illustrating journal entries of a journal associated with an L2P address mapping table in accordance with some embodiments of the present disclosure.

DETAILED DESCRIPTION

Figure 1:
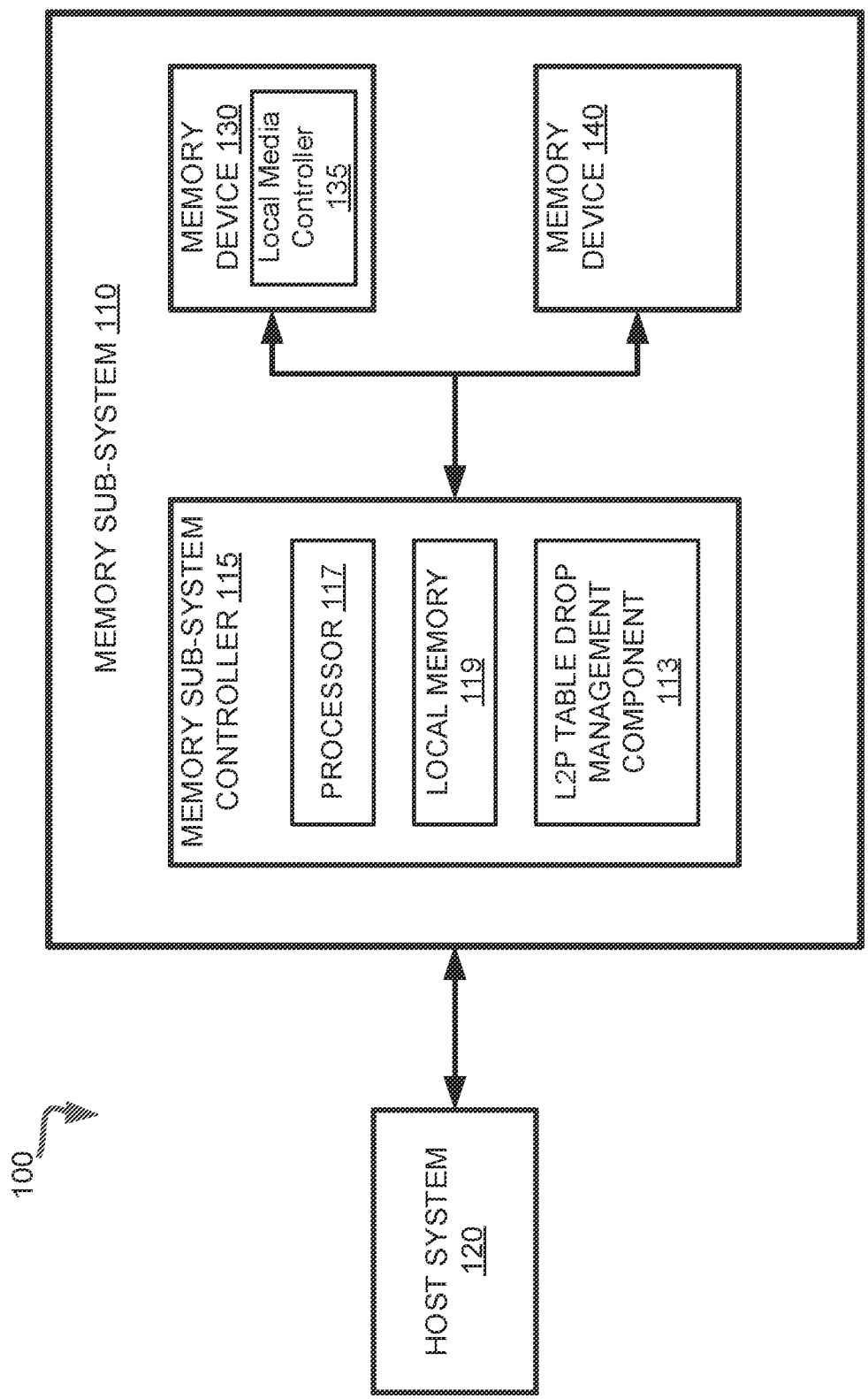
FIG. 1 illustrates an example computing system that includes a memory sub-system in accordance with some embodiments of the present disclosure.

Aspects of the present disclosure are directed to managing power loss recovery using an oldest section write policy for an address mapping table in a memory sub-system. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

Data operations can be performed by the memory sub-system. The data operations can be host-initiated operations. For example, the host system can initiate a data operation (e.g., write, read, erase, etc.) on a memory sub-system. The host system can send access requests (e.g., write commands, read commands) to the memory sub-system, such as to store data on a memory device at the memory sub-system and to read data from the memory device on the memory sub-system. The data to be read or written, as specified by a host request, is hereinafter referred to as "host data." A host request can include a logical address (e.g., a logical block address (LBA) and namespace) for the host data, which is the location that the host system associates with the host data. The logical address information (e.g., LBA, namespace) can be part of metadata for the host data. Metadata can also include error handling data (e.g., ECC codeword, parity code), data version (e.g., used to distinguish age of data written), valid bitmap (specifying which LBAs contain valid data), etc.

In order to isolate from the host system various aspects of physical implementations of memory devices employed by memory sub-systems, the memory sub-system controller can maintain a data structure that maps each LBA to a corresponding physical address (PA). For example, for flash memory, the physical address can include a channel identifier, die identifier, page identifier, plane identifier and/or frame identifier. The mapping data structure is referred to herein as a logical-to-physical (L2P) table. The L2P table can be segmented into multiple sections. Each section can have a number of regions, and each region can include a number of mapping entries. The L2P table is maintained by the firmware of the memory sub-system controller and is stored on one or more non-volatile memory devices of the memory sub-system. In order to improve the overall efficiency of the data transfer between a host system and a memory sub-system, the L2P table can be at least partially cached by one or more volatile memory devices of the memory sub-system, such that the cached portions of the L2P table can be accessed with lower latency.

The memory sub-system controller can save (e.g., write) updated (i.e., dirty) section(s) of the cached L2P table to a non-volatile memory device in the memory sub-system. Saving the dirty sections of the L2P table to the non-volatile memory device provides persistence to changes that would be lost in the event of a power loss. Further, saving the dirty sections of the L2P table to the non-volatile memory device can allow for reconstructing the L2P table after a power loss event. However, saving the dirty section(s) of the L2P table to the non-volatile memory device after each write operation and associated update to the cached portions of the L2P table can be expensive in terms of time and resources. Thus, in certain memory sub-systems, the memory sub-system controller can use a round robin policy where snapshots of the sections of the L2P table are periodically saved to a non-volatile memory device, such as upon writing a certain number of pages. However, in the round robin policy, sections of the L2P table are saved to the non-volatile memory device without regard to whether the sections are dirty (i.e., have been updated). Furthermore, the round robin policy can also become expensive as drive capacities and table sizes continue to increase, thereby also increasing the amount of data that needs to be written to non-volatile memory.

In certain memory sub-systems, a power loss event may occur before the L2P table has been fully stored to the non-volatile memory device, possibly leaving the L2P table in a state which is inconsistent with the state of the memory devices. For example, after a power loss event, the memory sub-system controller can use the latest saved snapshot before the power loss event for reconstructing the L2P table. However, such a snapshot may not reflect the L2P table updates that might have occurred between the last L2P table drop time (i.e., the time of saving the last snapshot) and the time of the power loss event. Accordingly, in certain memory sub-systems, the memory sub-system controller can further maintain a journal of L2P updates. The memory sub-system controller can record every update to the L2P table in a journal entry of the journal. The journal can be stored on the non-volatile memory device during a power loss event.

After the power loss event, the power loss recovery can involve reconstructing the L2P table by restoring the latest L2P table snapshot followed by replaying the journal entries storing the L2P updates that might have occurred between the last L2P table drop time and the power loss event. However, in order to identify which journal entries need to be replayed (i.e., which journal entries store the L2P updates that have occurred between the last L2P table drop time and the power loss event), the memory sub-system controller needs to read each journal, look at the time stamp of each journal entry of the journal, and compare whether the journal entry has a time stamp that is newer than the oldest section of the L2P table. If the time stamp is newer, then that journal entry will need to be replayed. If the time stamp is older, than that journal entry can be skipped (i.e., does not need to be replayed). In certain memory sub-systems utilizing a round robin policy as described herein above, the memory sub-system controller reconstructs the L2P table by restoring the latest L2P table snapshot followed by reading each journal and identifying the journal entries that need to be replayed from the oldest section of the L2P table to the time of the power loss event. However, reading each journal and going through the time stamp of each individual entry in each journal to identify the entries that need to be replayed can take time and thus can be expensive. Further, once the memory sub-system controller identifies the journal entries that need to be replayed, the memory sub-system controller must replay the identified journal entries (i.e., apply the L2P updates recorded by the identified journal entries to the L2P table). Replaying the L2P table involves reading the journal entry and updating (i.e., writing) the L2P table, which takes more time and thus can also be more expensive. Accordingly, effective L2P section drop policies can be desired in order to reconstruct the L2P table to a consistent state while reducing the amount of journals that have to be read and journal entries that have to be evaluated to determine whether they need to be replayed.

Aspects of the present disclosure address the above and other deficiencies by providing a memory sub-system that manages power loss recovery using an oldest section write policy for an address mapping table. A memory sub-system controller can maintain a set of sections of an L2P table cached in a volatile memory device in the memory sub-system. The memory sub-system controller can keep a count of the number of journals that have been written to non-volatile memory. The written journal count can reflect the number of L2P journals that must be read in reconstructing the L2P table. The memory sub-system controller can determine whether the written journal count satisfies a threshold criterion (e.g., the written journal count is greater than or equal to a threshold value). For example, the threshold value can represent a maximum number of journals written to a non-volatile memory device. If the memory sub-system controller determines that the written journal count satisfies the threshold criterion, the memory sub-system controller can identify a section of the L2P table that is an oldest section of the set of sections of the L2P table based on a flag associated with the section. The memory sub-system controller can write the dirty entries of the identified section to the non-volatile memory device. In response to writing the dirty entries of the identified section to the non-volatile memory device, the memory sub-system controller can set the flag associated with the identified section to indicate that the identified section is an oldest section of the set of sections. If the memory sub-system controller determines that the identified section does not comprise dirty entries, the memory sub-system controller can set a flag associated with another section (e.g., a logically consecutive section) to indicate that the other section is the oldest section of the set of sections of the L2P table. Following a power loss event, the memory sub-system controller can reconstruct the L2P table by restoring the L2P table based on the sections of the L2P table that are stored on the non-volatile memory device and by identifying the oldest section of the L2P table as indicated by the respective flag associated with each section. The memory sub-system controller can further identify, starting at the identified oldest section of the L2P table, journal entries with time stamps that are newer than the identified oldest section of the L2P table. The memory sub-system controller can then update the L2P table by replaying the identified journal entries.

Advantages of the present disclosure include, but are not limited to, reducing the amount of journals that are read and reducing the amount of journal entries that are identified as having to be replayed during a reconstruction of an L2P table following a power loss event. In certain memory sub-systems using a round robin policy, the memory sub-system controller reconstructs the L2P table by restoring the sections of the L2P table as stored in a non-volatile memory device and evaluating each journal and each journal entry of each journal starting at the oldest section of the L2P table, since there may be dirty entries in the oldest section that have not yet been written to the non-volatile memory device. In contrast, by writing the dirty entries of the oldest section of the L2P table to the non-volatile memory device once a written journal count satisfies a threshold criterion (i.e., there are at least a threshold number of written journals stored in the non-volatile memory device), the memory sub-system controller can write the dirty entries to the non-volatile memory device at a higher frequency than writing the dirty entries under the round robin policy. Further, since the memory sub-system controller determines whether the oldest section of the L2P table includes dirty entries, the memory sub-system controller can move the oldest section forward to the next logical section and indicate that the next section is the oldest section by setting a flag associated with the next section. The memory sub-system can thus ensure that the journals and each journal entry of each journal do not need to be read and evaluated beginning at the initial oldest section of the L2P table. Instead, another section of the L2P journal that is newer can be set as the oldest section of the L2P table. Therefore, the memory sub-system controller can read the journals and evaluate journal entries starting at the section that is indicated to be the oldest section of the L2P table based on the flag associated with the section, thereby reducing the amount of journals and journal entries that are read and evaluated. There can thus be an improvement in the amount of time it takes to recover following a power loss event. A faster recovery time during power-on can further result in an overall improvement in the performance of the memory sub-system.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes an L2P table drop management component 113 that can manage power loss recovery using an oldest section write policy for an address mapping table. In some embodiments, the memory sub-system controller 115 includes at least a portion of the L2P table drop management component 113. In some embodiments, the L2P table drop management component 113 is part of the host system 110, an application, or an operating system. In other embodiments, local media controller 135 includes at least a portion of L2P table drop management component 113 and is configured to perform the functionality described herein.

The L2P table drop management component 113 can maintain a set of sections of an L2P table cached in a volatile memory device in memory sub-system 110, such as memory device 140. In addition, the L2P table drop management component 113 can keep track of a written journal count. The written journal count can reflect a number of L2P journals written to non-volatile memory. The L2P journal can be stored in a non-volatile memory device in memory sub-system 110, such as memory device 130. The L2P table drop management component 113 can determine whether the written journal count satisfies a threshold criterion (e.g., whether the written journal count is greater than or equal to a threshold value). For example, the threshold value can represent a maximum number of journals written to a non-volatile memory device, such as memory device 130. If the L2P table drop management component 113 determines that the written journal count satisfies the threshold criterion, the L2P table drop management component 113 can identify a section of the set of sections of the L2P table cached in the non-volatile memory device. The section can be identified as an oldest section of the set of sections of the L2P table based on a flag associated with the section. The L2P table drop management component 113 can write the dirty entries of the identified section to the non-volatile memory device 130. In response to writing the dirty entries of the identified section to the non-volatile memory device 130, the L2P table drop management component 113 can set the flag associated with the identified section to indicate that the identified section is an oldest section of the set of sections. If the L2P table drop management component 113 determines that the identified section does not include dirty entries, the L2P table drop management component 113 can set a flag associated with another section (e.g., a logically consecutive section) to indicate that the other section is the oldest section of the set of sections of the L2P table. Following a power loss event, the L2P table drop management component 113 can reconstruct the L2P table by restoring the L2P table based on the sections of the L2P table that are stored on the non-volatile memory device 130 and by identifying the oldest section of the L2P table as indicated by the respective flag associated with each section. The L2P table drop management component 113 can further identify, starting at the identified oldest section of the L2P table, journal entries with time stamps that are newer than the identified oldest section of the L2P table. The L2P table drop management component 113 can then update the L2P table by replaying the identified journal entries. Further details with regards to the operations of the L2P table drop management component 113 are described below.

FIG. 2A is a block diagram illustrating a set of sections of an L2P table 200, in accordance with some embodiments of the present disclosure. An L2P table can have multiple sections. Each section of the L2P table can include 4K units (i.e., regions). Each region can include a number of entries, e.g., 1024 entries. Each entry can include a number of bits, e.g., 32 bits. For example, as illustrated in FIG. 2A, an L2P table 200 can have a set of sections including Section 201, Section 202, Section 203, Section 204, and Section 205. Each section can include a number of entries. For example, Section 201 can include Entry 201a— Entry 201e; Section 202 can include Entry 202a— Entry 202e; Section 203 can include Entry 203a— Entry 203e; Section 204 can include Entry 204a— Entry 204e; Section 205 can include Entry 205a— Entry 205e. An entry in a section that is dirty (i.e., has been updated) is illustrated using dashed lines. For example, FIG. 2A illustrates that Entry 202a, Entry 203a, Entry 203b, Entry 203c, Entry 203d, Entry 204e, Entry 205b, Entry 205c, and Entry 205e are dirty entries. In a memory sub-system solely utilizing a round robin policy, reconstructing the L2P table 200 following a power loss event can include reading journals and evaluating journal entries within each journal starting at the oldest section of the L2P table 200. For example, as illustrated in FIG. 2A, the arrow labeled first journal read 290 can indicate the starting point for reading journals associated with the L2P table 200 during reconstruction of the L2P table 200. Here, the first journal read 290 arrow indicates that journals will be read starting at section 201 of the L2P table 200. In some embodiments of the present disclosure, an L2P table drop management component (i.e., the L2P table drop management component 113 of FIG. 1) can identify the oldest section of the L2P table based on a flag associated with each section. The flag associated with each section can be one or more bits. When the one or more bits are set to a particular value, the one or more bits can indicate the presence of a certain condition (e.g., the one or more bits associated with each section can be set to a particular value to indicate that the section is the oldest section of the L2P table). In response to identifying the oldest section of the L2P table, the L2P table drop management component 113 can determine whether there are any dirty entries in the identified section. For example, in FIG. 2A, the L2P table drop management component 113 can identify that the oldest section of the L2P table is Section 201. The L2P table drop management component 113 can determine whether there are any dirty entries in Section 201. FIG. 2A depicts no dirty entries in Section 201. In response to determining that Section 201 has no dirty entries, the L2P table drop management component 113 can move to the next logical section (i.e., Section 202) and set a flag associated with Section 202 as being the oldest section. The L2P table drop management component 113 can determine whether there are any dirty entries in Section 202. Upon determining that Section 202 has a dirty entry (i.e., Entry 202a), the L2P table drop management component 113 can write the dirty entry of Section 202 to a non-volatile memory device. Further details with regard to the L2P table drop management component 113 and the L2P table are described herein below.

FIG. 2B is a block diagram illustrating journal entries of a journal associated with an L2P address mapping table (e.g., the L2P table 200 in FIG. 2A), in accordance with some embodiments of the present disclosure. As illustrated in FIG. 2B, an L2P address mapping table (e.g., the L2P table 200) can be associated with one or more journals, such as a journal 260. The journal 260 can be used for storing each update to an L2P address mapping table in a journal entry of the journal. The journal can be stored on a non-volatile memory device before a power loss event. The journal 260 can include a set of journal entries, including journal entry 261, journal entry 262, journal entry 263, and journal entry 264. Each journal entry can store data including a physical address, a logical address, and a timestamp for when the data was written to the journal entry. For example, the journal entry 261 can store data including a physical address 261a, a logical address 261b, and a timestamp 261c. The journal entry 262 can store data including a physical address 262a, a logical address 262b, and a timestamp 262c. The journal entry 263 can store data including a physical address 263a, a logical address 263b, and a timestamp 263c. The journal entry 264 can include a physical address 264a, a logical address 264b, and a timestamp 264c. As an example, the journal entry 261 can store data for the update that occurred at entry 202a of Section 202 of the L2P table 200 in FIG. 2A. Further details with regard to journal entries are described herein below.

Figure 3:
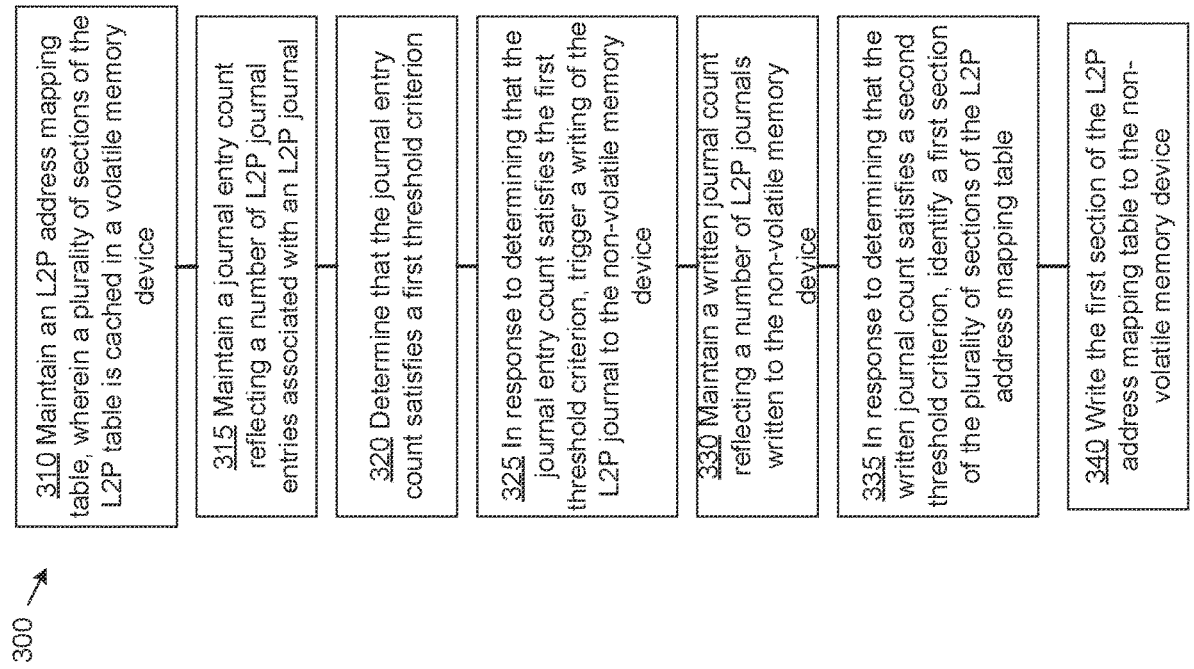
FIG. 3 is a flow diagram of an example method 300 for managing power loss recovery using an oldest section write policy for an address mapping table in a memory sub-system in accordance with some embodiments of the present disclosure.

FIG. 3 is a flow diagram of an example method 300 to manage power loss recovery using an oldest section write policy for an address mapping table in a memory sub-system, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the L2P table drop management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic maintains a logical-to-physical (L2P) table, such as L2P table 200 illustrated in FIG. 2A. The L2P table can be a data structure that includes a set of sections. The set of sections can be cached in a volatile memory device, such as memory device 140. In some embodiments, each section of the L2P table can have 4K units (i.e., regions). Each region of the L2P table can include a set of entries. In some embodiments, each region can include 1024 entries. Each entry can include a logical address mapped to a corresponding physical address.

At operation 315, the processing logic maintains a journal entry count. The journal entry count can reflect a number of journal entries associated with a journal. The journal can be used to store updates to the L2P table. The journal can be stored in a non-volatile memory device, such as memory device 130. In some embodiments, the processing logic can maintain the journal entry count using a data structure, such as a table. In some embodiments, the processing logic can maintain a counter for the journal. The processing logic can set the counter to an initial value (e.g., 0). In some embodiments, the processing logic can increment the counter by an integer value (e.g., 1) for every update to an entry of a section of the L2P table. An entry of a section of the L2P table can be updated in response to any change to the physical address associated with an LBA. In some embodiments, the processing logic can increment the counter by an integer value (e.g., 1) for every write to a journal entry of the journal.

At operation 320, the processing logic determines that the journal entry count satisfies a threshold criterion. In some embodiments, determining that the journal entry count satisfies the threshold criterion can include comparing the journal entry count to a threshold value. If the journal entry count is greater than or equal to the threshold value, the threshold criterion is satisfied. If the journal entry count is less than the threshold value, the threshold criterion is not satisfied. In some embodiments, the threshold value can be a maximum number of journal entries to be written to a non-volatile memory device, such as memory device 130, as described in more details herein above. The maximum number of journal entries to be written to the non-volatile memory device can be set based on the characteristics of the drive. In some embodiments, the maximum number of journal entries to be written to the non-volatile memory device can be 4000 journal entries (e.g., a maximum number of journal entries in a journal).

At operation 325, the processing logic triggers a writing of the journal to the non-volatile memory device. In some embodiments, exceeding the threshold maximum number of journal entries to be written to the non-volatile memory device can trigger the writing of the journal to the non-volatile memory.

At operation 330, the processing logic maintains a written journal count reflecting a number of journals written to the non-volatile memory device. In some embodiments, the processing logic can set the written journal count to an initial value (e.g., 0). In some embodiments, the written journal count can be incremented by an integer value (e.g., 1) in response to the writing of the journal to the non-volatile memory.

At operation 335, the processing logic identifies a section of the set of sections of the L2P table. In some embodiments, the processing logic can identify the section in response to determining that the written journal count satisfies a threshold criterion. In some embodiments, the threshold criterion can be a threshold value of journals written to the non-volatile memory device. Determining that the written journal count satisfies the threshold criterion can include determining that the written journal count is greater than or equal to the threshold value of journals written to the non-volatile memory device. In some embodiments, the processing logic identifies the section based on a flag associated with the section. The flag associated with each section can be one or more bits. The one or more bits can be set to a particular value to indicate the presence of a certain condition. In some embodiments, the flag can be set to indicate that the section is an oldest section of the set of sections. In some embodiments, the oldest section of the set of sections is the section of the set of sections that was least recently programmed (i.e., written to).

At operation 340, the processing logic writes the section identified at operation 325 to the non-volatile memory device. In some embodiments, writing the section to the non-volatile memory device can include determining that the identified section includes one or more dirty entries. Determining that the identified section includes one or more dirty entries of the section can include identifying whether entries of the section have been updated (i.e., written to). In response to determining that the identified section includes one or more dirty entries, the processing logic can write the one or more dirty entries of the identified section to the non-volatile memory device. In some embodiments, the processing logic can set a flag associated with the identified section to indicate that the identified section is the oldest section of the set of sections. In some embodiments, the processing logic can set the flag in response to writing the one or more dirty entries of the identified section to the non-volatile memory device. In some embodiments, the processing logic can determine that the identified section does not include a dirty entry (i.e., no entry of the section has been updated). In response to determining that the identified section does not include a dirty entry, the processing logic can identify another section of the set of sections of the L2P table. In some embodiments, the other section can be a logically consecutive section. For example, as illustrated in FIG. 2A, the processing logic can identify a Section 202 as logically consecutive to a Section 201. The processing logic can set a flag associated with the other section (e.g., Section 202) to indicate that the other section is the oldest section of the set of sections. In some embodiments, the one or more dirty entries written to the non-volatile memory device can be used to reconstruct the L2P table following a power loss event. In some embodiments, reconstructing the L2P table can include restoring the L2P table using the sections of the L2P table stored on the non-volatile memory device. The processing logic can identify the oldest section of the L2P table by comparing the flag associated with each section of the set of sections and identifying the section with a flag set to indicate that the section is the oldest section of the set of sections. In some embodiments, the processing logic can read each journal associated with the L2P table. The processing logic can read each journal starting with the journal associated with the section of the set of sections of the L2P table identified as the oldest section. The processing logic can identify one or more journal entries of each journal. The processing logic can identify the one or more journal entries by comparing a timestamp stored at each journal entry with a timestamp associated with each entry of each section of the L2P table. If the timestamp stored at the journal entry is newer than the timestamp associated with the entry of the section of the L2P table, the processing logic can update the L2P table by replaying the journal entry. If the timestamp stored at the journal entry is older than the timestamp associated with the entry of the section of the L2P table, the processing logic can skip the journal entry (e.g., the journal entry is not replayed). In some embodiments, replaying the journal entry can include reading data stored on the journal entry. The data can reflect an update to an entry of a section of the L2P table. The processing logic can apply the update to the L2P table.

Figure 4:
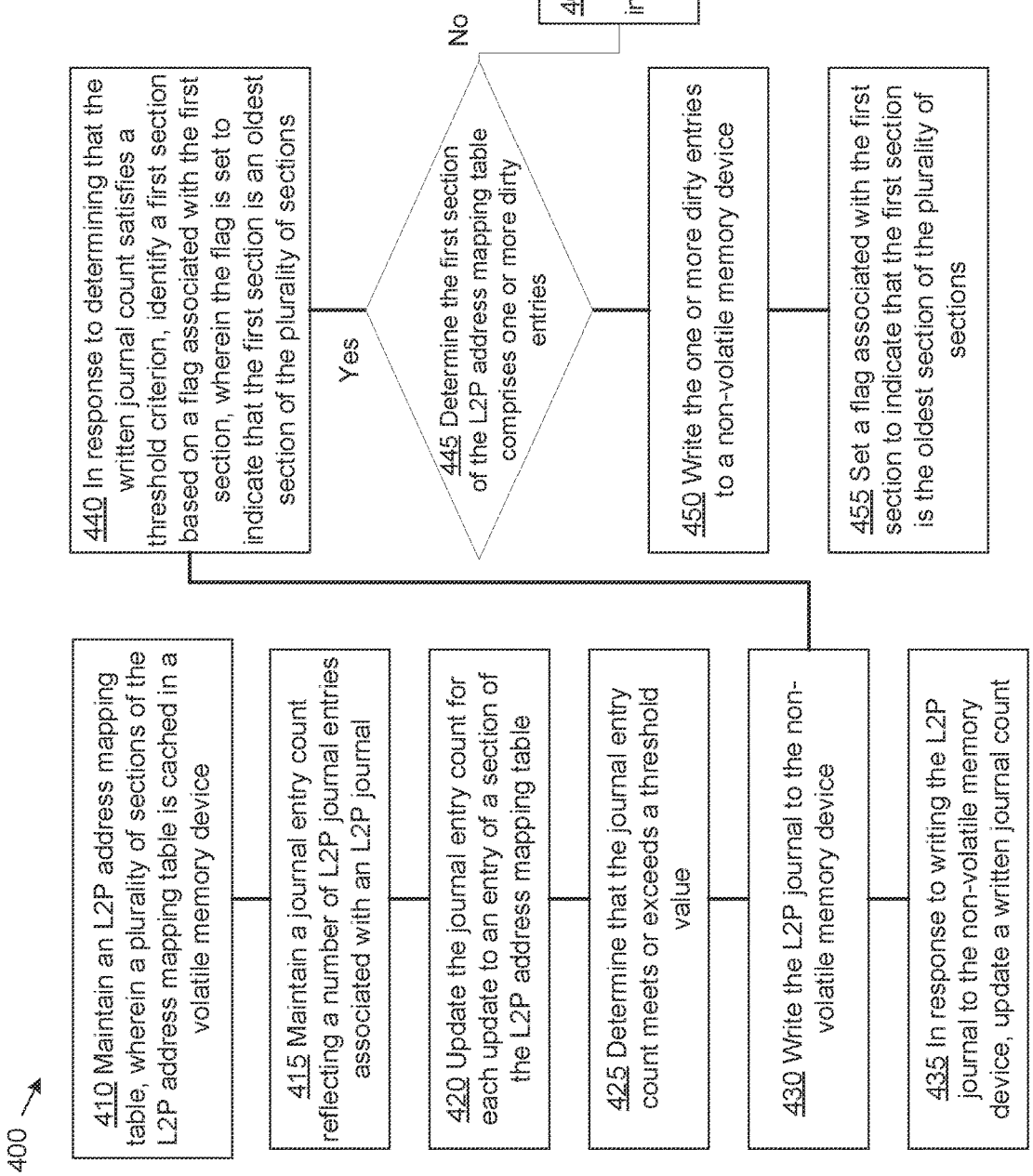
FIG. 4 is a flow diagram of an example method 400 for managing power loss recovery using an oldest section write policy for an address mapping table in a memory sub-system in accordance with some embodiments of the present disclosure.

FIG. 4 is a flow diagram of an example method 400 to manage power loss recovery using an oldest section write policy for an address mapping table in a memory subsystem, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the L2P table drop management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic maintains a logical-to-physical (L2P) table, such as L2P table 200 illustrated in FIG. 2A. The L2P table can be a data structure that includes a set of sections. The set of sections can be cached in a volatile memory device, such as memory device 140. In some embodiments, each section of the L2P table can have 4K units (i.e., regions). Each region of the L2P table can include a set of entries. In some embodiments, each region can include 1024 entries. Each entry can include a logical address mapped to a corresponding physical address.

At operation 415, the processing logic maintains a journal entry count. The journal entry count can reflect a number of journal entries associated with a journal. The journal can be used to store updates to the L2P table. The journal can be stored in a non-volatile memory device, such as memory device 130. In some embodiments, the processing logic can maintain the journal entry count using a data structure, such as a table.

At operation 420, the processing logic can maintain a counter for the journal. The processing logic can set the counter to an initial value (e.g., 0). In some embodiments, the processing logic can increment the counter by an integer value (e.g., 1) for every update to an entry of a section of the L2P table. An entry of a section of the L2P table can be updated in response to a host write or garbage collection write. In some embodiments, the processing logic can increment the counter by an integer value (e.g., 1) for every write to a journal entry of the journal.

At operation 425, the processing logic determines that the journal entry count satisfies a threshold criterion. In some embodiments, determining that the journal entry count satisfies the threshold criterion can include comparing the journal entry count to a threshold value. If the journal entry count is greater than or equal to the threshold value, the threshold criterion is satisfied. If the journal entry count is less than the threshold value, the threshold criterion is not satisfied. In some embodiments, the threshold value can be a maximum number of journal entries to be written to a non-volatile memory device, such as memory device 130, as described in more details herein above. The maximum number of journal entries to be written to the non-volatile memory device can be set based on the characteristics of the drive. In some embodiments, the maximum number of journal entries to be written to the non-volatile memory device can be 4000 journal entries (e.g., a maximum number of journal entries in a journal).

At operation 430, the processing logic writes the journal to the non-volatile memory device. In some embodiments, the journal entry count exceeding the threshold maximum number of journal entries to be written to the non-volatile memory device can trigger the writing of the journal to the non-volatile memory.

At operation 435, the processing logic updates a written journal count. In some embodiments, the processing logic maintains a written journal count reflecting a number of journals written to the non-volatile memory device. In some embodiments, the processing logic can set the written journal count to an initial value (e.g., 0). In some embodiments, the written journal count can be incremented by an integer value (e.g., 1) in response to the writing of the journal to the non-volatile memory.

At operation 440, the processing logic identifies a section of the set of sections of the L2P table. In some embodiments, the processing logic can identify the section in response to determining that the written journal count satisfies a threshold criterion. In some embodiments, the threshold criterion can be a threshold value of journals written to the non-volatile memory device. Determining that the written journal count satisfies the threshold criterion can include determining that the written journal count is greater than or equal to the threshold value of journals written to the non-volatile memory device. In some embodiments, the processing logic identifies the section based on a flag associated with the section. The flag associated with each section can be one or more bits. The one or more bits can be set to a particular value to indicate the presence of a certain condition. In some embodiments, the flag can be set to indicate that the section is an oldest section of the set of sections. In some embodiments, the oldest section of the set of sections is the section of the set of sections that was least recently programmed (i.e., written to).

At operation 445, the processing logic determines that the identified section includes one or more dirty entries. Determining that the identified section includes one or more dirty entries of the section can include identifying whether entries of the section have been updated (i.e., written to).

At operation 450, in response to determining that the identified section includes one or more dirty entries, the processing logic can write the one or more dirty entries of the identified section to the non-volatile memory device.

At operation 455, in response to writing the one or more dirty entries of the identified section to the non-volatile memory device, the processing logic can set a flag associated with the identified section to indicate that the identified section is the oldest section of the set of sections. In some embodiments, the one or more dirty entries written to the non-volatile memory device can be used to reconstruct the L2P table following a power loss event. In some embodiments, reconstructing the L2P table can include restoring the L2P table using the sections of the L2P table stored on the non-volatile memory device. The processing logic can identify the oldest section of the L2P table by comparing the flag associated with each section of the set of sections and identifying the section with a flag set to indicate that the section is the oldest section of the set of sections. In some embodiments, the processing logic can read each journal associated with the L2P table. The processing logic can read each journal starting with the journal associated with the section of the set of sections of the L2P table identified as the oldest section. The processing logic can identify one or more journal entries of each journal. The processing logic can identify the one or more journal entries by comparing a timestamp stored at each journal entry with a timestamp associated with each entry of each section of the L2P table. If the timestamp stored at the journal entry is newer than the timestamp associated with the entry of the section of the L2P table, the processing logic can update the L2P table by replaying the journal entry. If the timestamp stored at the journal entry is older than the timestamp associated with the entry of the section of the L2P table, the processing logic can skip the journal entry (e.g., the journal entry is not replayed). In some embodiments, replaying the journal entry can include reading data stored on the journal entry. The data can reflect an update to an entry of a section of the L2P table. The processing logic can apply the update to the L2P table.

At operation 460, in response to determining that the identified section does not include a dirty entry (i.e., no entry of the section has been updated), the processing logic can identify another section of the set of sections of the L2P table. In some embodiments, the other section can be a logically consecutive section. For example, as illustrated in FIG. 2A, the processing logic can identify a Section 202 as logically consecutive to a Section 201. The processing logic can set a flag associated with the other section (e.g., Section 202) to indicate that the other section is the oldest section of the set of sections.

Figure 5:
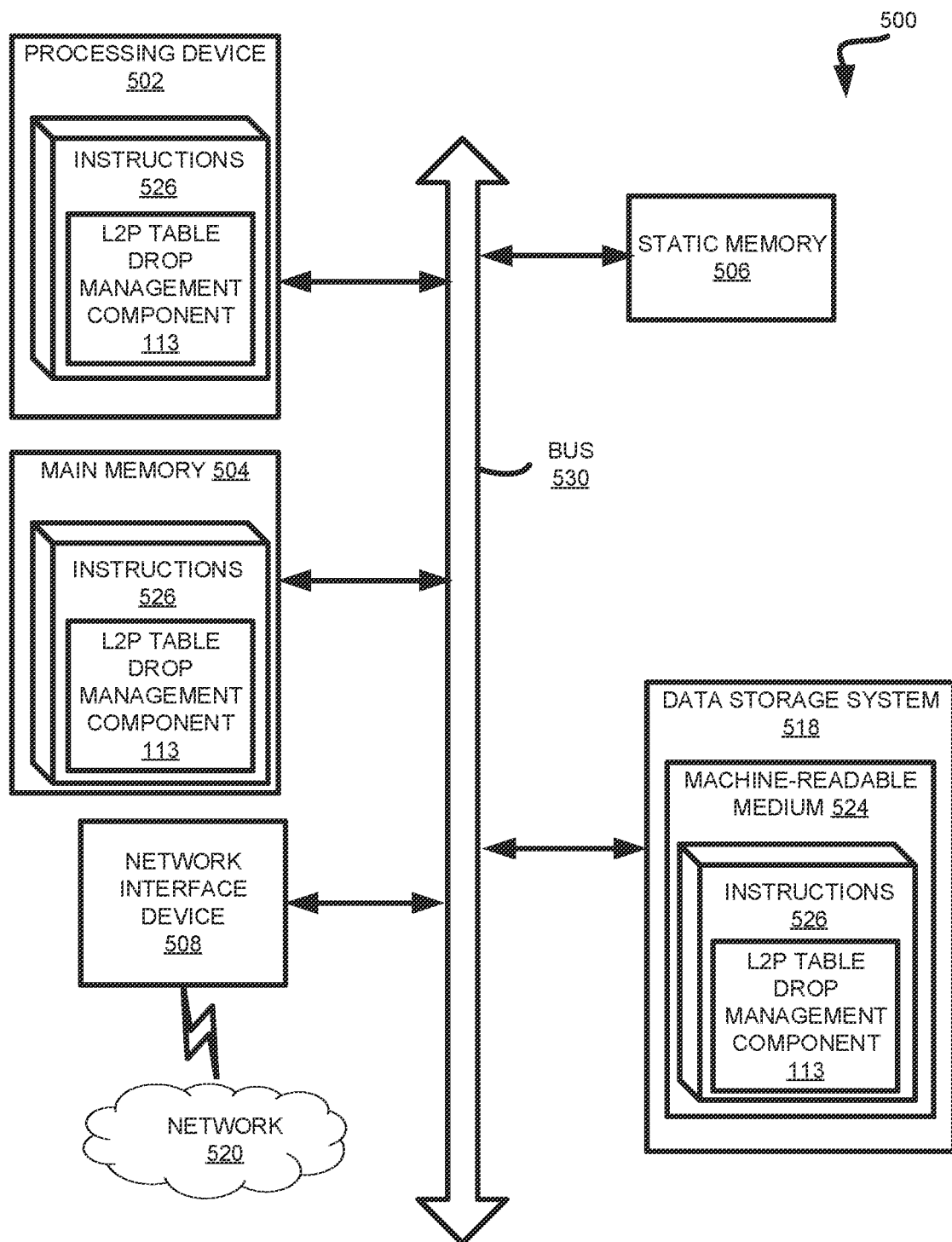
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the L2P table drop management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to an L2P table drop management component 113 (e.g., the L2P table drop management component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a volatile memory device;
a non-volatile memory device; and
a processing device, operatively coupled with the volatile and non-volatile memory devices, to perform operations comprising:
maintaining a logical-to-physical (L2P) address mapping table, wherein a plurality of sections of the L2P address mapping table is cached in the volatile memory device;
maintaining a journal entry count reflecting a number of L2P journal entries associated with an L2P journal;
determining that the journal entry count satisfies a first threshold criterion;
in response to determining that the journal entry count satisfies the first threshold criterion, triggering a writing of the L2P journal to the non-volatile memory device;
maintaining a written journal count reflecting a number of L2P journals written to the non-volatile memory device;
in response to determining that the written journal count satisfies a second threshold criterion, identifying a first section of the plurality of sections of the L2P address mapping table; and
writing the first section of the L2P address mapping table to the non-volatile memory device.

2. The system of claim 1, wherein determining that the journal entry count satisfies the first threshold criterion comprises:
updating the journal entry count for each update to an entry of a section of the L2P address mapping table;
determining that the journal entry count meets or exceeds a threshold value;
writing the L2P journal to the non-volatile memory device; and
in response to writing the L2P journal to the non-volatile memory device, updating the written journal count.

3. The system of claim 1, wherein identifying the first section of the plurality of sections of the L2P address mapping table comprises:
identifying the first section based on a flag associated with the first section, wherein the flag is set to indicate that the first section is an oldest section of the plurality of sections.

4. The system of claim 1, wherein writing the first section of the L2P address mapping table to the non-volatile memory device comprises:
determining that the first section of the L2P address mapping table comprises one or more dirty entries;
responsive to determining that the first section of the L2P address mapping table comprises the one or more dirty entries, writing the one or more dirty entries to the non-volatile memory device; and
setting a flag associated with the first section to indicate that the first section is an oldest section of the plurality of sections.

5. The system of claim 1, further comprising:
determining that the first section of the L2P address mapping table does not comprise one or more dirty entries; and
setting a flag associated with a second section of the plurality of sections of the L2P address mapping table to indicate the second section is an oldest section of the plurality of sections.

6. The system of claim 1, further comprising:
responsive to detecting a power up event following a power loss event, reconstructing the L2P address mapping table, wherein reconstructing the L2P address mapping table comprises:
restoring the L2P address mapping table based on sections of the L2P address mapping table stored on the non-volatile memory device;
identifying an oldest section of the L2P address mapping table based on a flag associated with the section;
identifying an L2P journal entry of a plurality of L2P journal entries based on a time stamp associated with the L2P journal entry; and
updating the L2P address mapping table by replaying the L2P journal entry.

7. The system of claim 6, wherein updating the L2P address mapping table by replaying the L2P journal entry comprises:
reading data stored on the L2P journal entry, wherein the data reflects an update to an entry of a section of the L2P address mapping table; and
applying the update to the L2P address mapping table.

8. A method comprising:
maintaining a logical-to-physical (L2P) address mapping table, wherein a plurality of sections of the L2P address mapping table is cached in a volatile memory device;
maintaining a journal entry count reflecting a number of L2P journal entries associated with an L2P journal;

determining that the journal entry count satisfies a first threshold criterion;

in response to determining that the journal entry count satisfies the first threshold criterion, triggering a writing of the L2P journal to a non-volatile memory device;

maintaining a written journal count reflecting a number of L2P journals written to the non-volatile memory;

in response to determining that the written journal count satisfies a second threshold criterion, identifying a first section of the plurality of sections of the L2P address mapping table; and writing the first section of the L2P address mapping table to a non-volatile memory device.

9. The method of claim 8, wherein determining that the journal entry count satisfies the first threshold criterion comprises:

updating the journal entry count for each update to an entry of a section of the L2P address mapping table;

determining that the journal entry count meets or exceeds a threshold value;

writing the L2P journal to the non-volatile memory; and in response to writing the L2P journal to the non-volatile memory, updating the written journal count.

10. The method of claim 8, wherein identifying the first section of the plurality of sections of the L2P address mapping table comprises:

identifying the first section based on a flag associated with the first section, wherein the flag is set to indicate that the first section is an oldest section of the plurality of sections.

11. The method of claim 8, wherein writing the first section of the L2P address mapping table to the non-volatile memory device comprises:

determining that the first section of the L2P address mapping table comprises one or more dirty entries;

responsive to determining that the first section of the L2P address mapping table comprises the one or more dirty entries, writing the one or more dirty entries to the non-volatile memory device; and setting a flag associated with the first section to indicate that the first section is an oldest section of the plurality of sections.

12. The method of claim 8, further comprising:

determining that the first section of the L2P address mapping table does not comprise one or more dirty entries; and setting a flag associated with a second section of the plurality of sections of the L2P address mapping table to indicate the second section is an oldest section of the plurality of sections.

13. The method of claim 8, further comprising:

responsive to detecting a power up event following a power loss event, reconstructing the L2P address mapping table, wherein reconstructing the L2P address mapping table comprises:

restoring the L2P address mapping table based on sections of the L2P address mapping table stored on the non-volatile memory device;

identifying an oldest section of the L2P address mapping table based on a flag associated with the section;

identifying an L2P journal entry of a plurality of L2P journal entries based on a time stamp associated with the L2P journal entry; and updating the L2P address mapping table by replaying the L2P journal entry.

14. The method of claim 13, wherein updating the L2P address mapping table by replaying the L2P journal entry comprises:

reading data stored on the L2P journal entry, wherein the data reflects an update to an entry of a section of the L2P address mapping table; and applying the update to the L2P address mapping table.

15. A non-transitory computer-readable storage medium comprising instructions that, when executed by a processing device, cause the processing device to perform operations comprising:

maintaining a logical-to-physical (L2P) address mapping table, wherein a plurality of sections of the L2P address mapping table is cached in a volatile memory device;

maintaining a journal entry count reflecting a number of L2P journal entries associated with an L2P journal;

determining that the journal entry count satisfies a first threshold criterion;

in response to determining that the journal entry count satisfies the first threshold criterion, triggering a write of the L2P journal to a non-volatile memory;

in response to writing the L2P journal to a non-volatile memory, updating a written journal count;

determining that the written journal count satisfies a second threshold criterion;

in response to determining that the written journal count satisfies the second threshold criterion, identifying a first section of the plurality of sections of the L2P address mapping table;

determining that the first section of the L2P address mapping table comprises one or more dirty entries;

responsive to determining that the first section of the L2P address mapping table comprises the one or more dirty entries, writing the one or more dirty entries to a non-volatile memory device; and setting a flag associated with the first section to indicate that the first section is an oldest section of the plurality of sections.

16. The non-transitory computer-readable storage medium of claim 15, wherein determining that the journal entry count satisfies the first threshold criterion comprises:

updating the journal entry count for each update to an entry of a section of the L2P address mapping table;

determining that the journal entry count meets or exceeds a threshold value; and in response to determining that the journal entry count meets or exceeds the threshold value, writing the L2P journal to the non-volatile memory.

17. The non-transitory computer-readable storage medium of claim 15, wherein identifying the first section of the plurality of sections of the L2P address mapping table comprises:

identifying the first section based on a flag associated with the first section, wherein the flag is set to indicate that the first section is the oldest section of the plurality of sections.

18. The non-transitory computer-readable storage medium of claim 15, wherein the processing device is to perform operations further comprising:

determining that the first section of the L2P address mapping table does not comprise the one or more dirty entries; and setting a flag associated with a second section of the plurality of sections of the L2P address mapping table to indicate the second section is the oldest section of the plurality of sections.

19. The non-transitory computer-readable storage medium of claim 15, wherein the processing device is to perform operations further comprising:
- responsive to detecting a power up event following a power loss event, reconstructing the L2P address mapping table, wherein reconstructing the L2P address mapping table comprises:
  - restoring the L2P address mapping table based on sections of the L2P address mapping table stored on the non-volatile memory device;
  - identifying an oldest section of the L2P address mapping table based on a flag associated with the section;
  - identifying an L2P journal entry of a plurality of L2P journal entries based on a time stamp associated with the L2P journal entry; and
  - updating the L2P address mapping table by replaying the L2P journal entry.

20. The non-transitory computer-readable storage medium of claim 19, wherein updating the L2P address mapping table by replaying the L2P journal entry comprises:
- reading data stored on the L2P journal entry, wherein the data reflects an update to an entry of a section of the L2P address mapping table; and
- applying the update to the L2P address mapping table.

* * * * *